United States Patent
Krishnamoorthy

(10) Patent No.: US 7,716,193 B2
(45) Date of Patent: May 11, 2010

(54) ENSURING TIMELY SERVICING OF DESIRED TRANSACTIONS IN A DATABASE SERVER

(75) Inventor: Karthick Krishnamoorthy, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 1036 days.

(21) Appl. No.: 11/164,493

(22) Filed: Nov. 25, 2005

(65) Prior Publication Data

US 2007/0106669 A1 May 10, 2007

(30) Foreign Application Priority Data

Oct. 13, 2005 (IN) .................. 1470/CHE/2005

(51) Int. Cl.
*G06F 7/00* (2006.01)
(52) U.S. Cl. ..................... 707/703; 707/705
(58) Field of Classification Search .............. 707/10, 707/2, 1, 104.1, 703, 705
See application file for complete search history.

(56) References Cited

U.S. PATENT DOCUMENTS

| | | | | |
|---|---|---|---|---|
| 5,261,069 A * | 11/1993 | Wilkinson et al. | .......... | 711/145 |
| 5,404,523 A * | 4/1995 | DellaFera et al. | .......... | 718/101 |
| 5,423,037 A * | 6/1995 | Hvasshovd | .......... | 707/202 |
| 5,544,320 A * | 8/1996 | Konrad | .......... | 709/203 |
| 5,638,374 A * | 6/1997 | Heath | .......... | 370/322 |
| 5,701,457 A * | 12/1997 | Fujiwara | .......... | 707/8 |
| 5,745,694 A * | 4/1998 | Egawa et al. | .......... | 709/225 |
| 5,758,149 A * | 5/1998 | Bierma et al. | .......... | 707/8 |
| 5,761,494 A * | 6/1998 | Smedley et al. | .......... | 707/4 |
| 5,890,161 A * | 3/1999 | Helland et al. | .......... | 707/103 R |
| 5,999,973 A * | 12/1999 | Glitho et al. | .......... | 709/223 |
| 6,023,679 A * | 2/2000 | Acebo et al. | .......... | 705/5 |
| 6,085,200 A * | 7/2000 | Hill et al. | .......... | 707/202 |
| 6,122,642 A * | 9/2000 | Mehovic | .......... | 707/104.1 |
| 6,327,700 B1 * | 12/2001 | Chen et al. | .......... | 717/127 |
| 6,546,403 B1 * | 4/2003 | Carlson et al. | .......... | 707/202 |
| 6,574,314 B1 * | 6/2003 | Martino | .......... | 379/93.17 |
| 6,631,374 B1 * | 10/2003 | Klein et al. | .......... | 707/8 |
| 6,745,224 B1 * | 6/2004 | D'Souza et al. | .......... | 709/202 |
| 6,813,636 B1 * | 11/2004 | Bean et al. | .......... | 709/226 |
| 6,848,109 B1 * | 1/2005 | Kuhn | .......... | 719/315 |
| 2001/0047313 A1 * | 11/2001 | Kanai | .......... | 705/26 |

(Continued)

OTHER PUBLICATIONS

Elmagarmid,, Ahmed and Jing,, Jin and Bukhres,, Omran; An efficient and reliable reservation algorithm for mobile transactions; CIKM '95: Proceedings of the fourth international conference on Information and knowledge management; 1995; pp. 90-95.*

(Continued)

*Primary Examiner*—Robert Stevens
(74) *Attorney, Agent, or Firm*—Narendra Reddy Thappeta

(57) ABSTRACT

Ensuring that desired transactions are serviced in a timely manner in a database server. Resources are reserved ahead for transaction classes of interest, and the corresponding information is stored in a resource reservation table. In one embodiment, each transaction instance is admitted for servicing only if the reservation table indicates that sufficient resources are reserved for the transaction at the time instance the transaction is received. Resources may be reserved for specific transaction instances by using a label value, which would be contained in each transaction for which the time slot is reserved.

22 Claims, 6 Drawing Sheets

U.S. PATENT DOCUMENTS

| | | | |
|---|---|---|---|
| 2002/0002478 A1* | 1/2002 | Swart et al. | 705/8 |
| 2002/0095319 A1* | 7/2002 | Swart et al. | 705/6 |
| 2002/0095328 A1* | 7/2002 | Swart et al. | 705/10 |
| 2002/0099613 A1* | 7/2002 | Swart et al. | 705/26 |
| 2002/0143979 A1* | 10/2002 | Douceur et al. | 709/231 |
| 2004/0205006 A1* | 10/2004 | Kanai | 705/26 |
| 2005/0228892 A1* | 10/2005 | Riley et al. | 709/228 |
| 2006/0248136 A1* | 11/2006 | Loacker et al. | 708/446 |

OTHER PUBLICATIONS

Preguiça, Nuno, et al., "Reservations for Conflict Avoidance in a Mobile Database System", MobiSys 2003, © 2003, pp. 1-14.*

Barros, A. P., et al., "Towards an Integrated Conceptual Modelling Kernel for Business Transaction Workflows", Citeseer, © 1996, pp. 1-32.*

Attie, Paul C., et al., "Specifying and Enforcing Intertask Dependencies", Proc. of the 19th VLDB, Dublin, Ireland, © 1993, pp. 134-145.*

Elmagarmid, Ahmed K., et al., "Transaction Models for Advanced Database Applications", CSD-TR-91-022, May 1991, pp. cover page and 1-103.*

Preguiça, Nuno, et al., "Mobile Transaction Management in Mobisnap", ADBIS-DASFAA 2000, LNCS 1884, Springer-Verlag, Berlin, Germany, © 2000, pp. 379-386.*

Haritsa, Jayant R., et al., "Value-Based Scheduling in Real-Time Database Systems", The VLDB Journal, vol. 2. No. 2, Apr. 1993, pp. 117-152.*

Hansson, J., et al., "Dynamic Transaction Scheduling and Reallocation in Overloaded Real-Time Database Systems", RTCSA, Hiroshima, Japan, Oct. 27-29, 1998, pp. 293-302.*

"Oracle9 i Database Resource Manager", from http://www.oracle.com/technology/deploy/availability/htdocs/rm_overview.html#realworld; Oracle Network Technology, download date Jul. 14, 2005; pp. 1-6, Oracle Application Server Portal, USA.

"Assuring Business Service Levels", Solution White Paper; from http://www.optier.com/downloads/OpTier_Solution_WP.pdf ; Jul. 2005; pp. 1-9; OpTier Inc. 15 East 26th Street, New York, NY.

Walter Oliver; "Writing MS Transaction Server Resource Dispensers", from http://www.microsoft.com/technet/archive/transsrv/resdispr.mspx; pp. 1-13 and Table of Contents—1-2 pages; download date Jul. 14, 2005; Microsoft corporation, USA.

"Transaction Management", Oracle9i Database concepts; Release 2 (9.2), Part No. A96524-01 from http://www.lc.leidenuniv.nl/awcourse/oracle/server.920/a96524/c17trans.htm#1667; pp. 1-9; 1996-2002, Oracle Corporation. USA.

* cited by examiner

| Transaction ID 511 | Transaction Name 512 | Start Time 513 | End Time 514 | Present Database 515 | Related-Database 516 | User 517 | CPU Usage 518 | Priority 519 |
|---|---|---|---|---|---|---|---|---|
| 1234 | Fund_Transfer | 12.05.2005 1:00pm | 12.05.2005 5:00pm | orhccl:3345 :ORCL | hdfg:2243: RTHD | Joe | 50% | High |
| 6738 | Update_Account | 23.05.2005 7:00pm | 23.05.2005 9:00pm | orclhcl123: 1234:ORCL | hdfg123: 3563: RTHD | Scott | 25% | Low |

531 532

*FIG. 5* ns in a Database Server", Serial Number: 1470/CHE/2005, Filed: Oct. 13, 2005, naming the same inventors as in the subject patent application.

ENSURING TIMELY SERVICING OF DESIRED TRANSACTIONS IN A DATABASE SERVER

RELATED APPLICATIONS

The present application is related to and claims priority from the co-pending India Patent Application entitled, "Ensuring Timely Servicing of Desired Transactions in a Database Server", Serial Number: 1470/CHE/2005, Filed: Oct. 13, 2005, naming the same inventors as in the subject patent application.

BACKGROUND OF THE INVENTION

1. Field of the Invention

The present invention relates to database technologies, and more specifically to a method and apparatus to ensure timely servicing of desired transactions in a database server.

2. Related Art

A database server generally refers to a system which permits organization (e.g., in the form of tables in the case of relational tables) and management (addition, deletion, or change) of related data using structured queries (e.g., Structured Query Language, SQL). A database server typically processes a query and generates a corresponding response.

Database servers often process a set of related queries, which together form a transaction. A transaction generally refers to an activity (or queries supporting a logical unit of work) such as money transfer, sale, etc., and may require execution of one or more queries to complete (support for) the corresponding activity. All the queries forming a transaction need to be successfully executed or the effect of completed queries needs to be reversed if the execution of a later transaction fails. This property is generally referred to as 'atomicity requirement'.

Generally, transactions are received and scheduled for processing using one of various known scheduling approaches. However, since the resources (such as processor time, memory, access to secondary storage, etc) available for processing the transactions are finite, the time taken to service a transaction is often not predictable. The time to service a transaction in any time interval depends on the total number of transactions awaiting servicing and resource requirements of transactions.

It is often desirable that a desired set of transactions be serviced in a timely manner, for example, without much wait time before start of servicing. Various aspects of the present invention provide at least such a feature, as described below.

BRIEF DESCRIPTION OF THE DRAWINGS

The present invention will be described with reference to the accompanying drawings briefly described below.

FIG. 5 illustrates the details of a reservation table in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A database server provided according to an aspect of the present invention receives data (reservation data) indicating a time slot in which a class of transactions are to be serviced and the resources required during that time slot. The reservation data is accepted only if the required resources can be reserved for the class of transactions. Any other transactions, not expressly reserved for, are serviced only if more resources than those required for the reserved transactions are available.

Such a feature is particularly useful in environments where there is predictability of transactions (e.g., based on historical data), and it is desirable to ensure timely servicing of transactions of importance.

In an embodiment, the class of transactions are identified by a label, which is received associated with each transaction. The label is also used to identify the class of transactions in the reservation table. As a result, specific transaction instances may be serviced in a timely manner, as desired.

In one corresponding implementation, the client systems initiating the transactions first reserve the corresponding desired time slots, before sending the transaction requests. In addition (or in the alternative), a database administrator may reserve the time slots for transaction instances.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
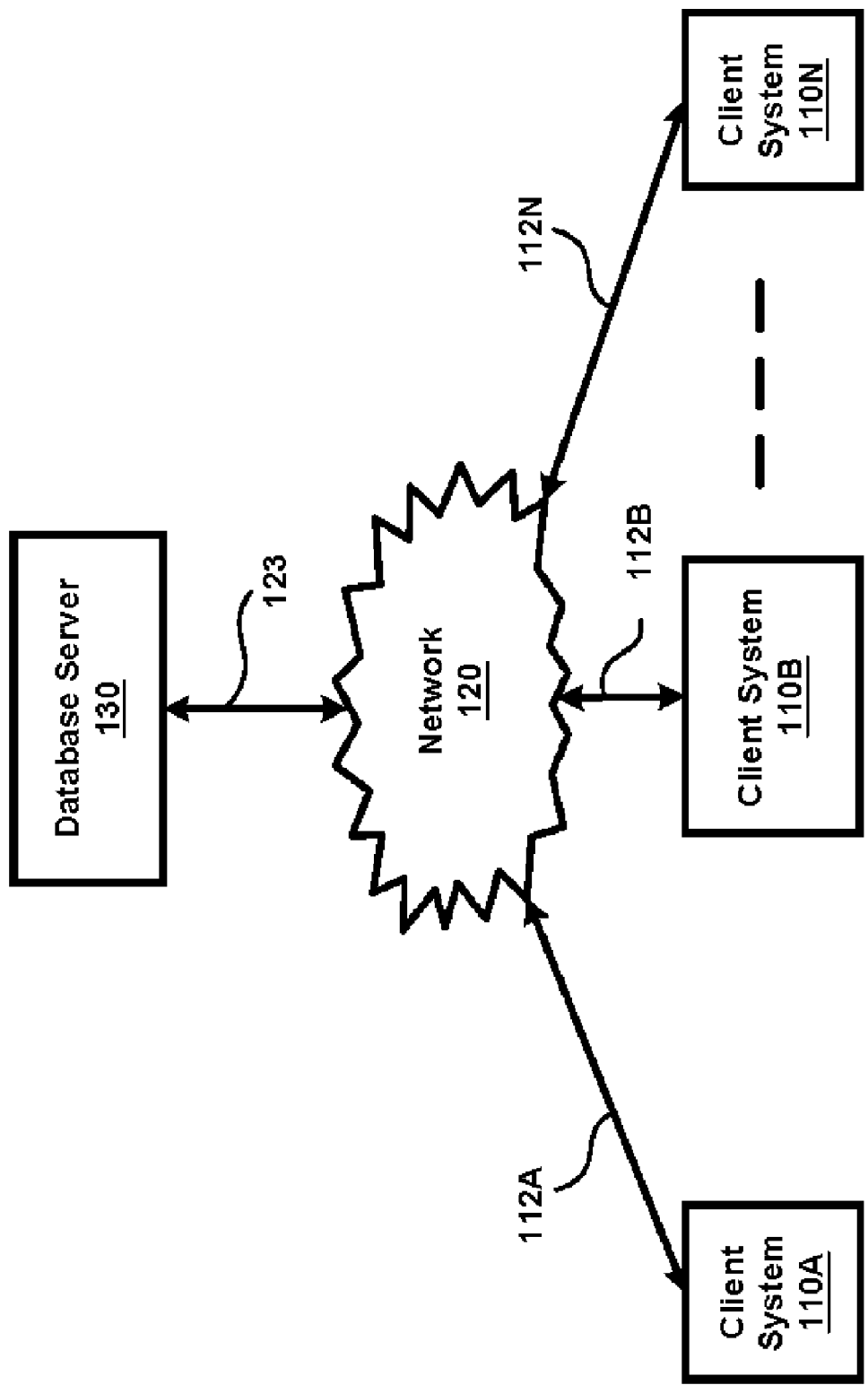
FIG. 1 is a block diagram illustrating the details of an example environment in which various aspects of the present invention can be implemented.

FIG. 1 is a block diagram illustrating an example environment in which various aspects of the present invention can be implemented. The environment is shown containing database server 130, network 120, and client systems 100A through 100N. Each system/device is described below in further detail.

Network 120 provides the connectivity to facilitate forwarding of transaction related data from client systems to database server 130 on path 123, and the responses from database server 130 back to client systems on the corresponding paths. Network 120 may be implemented using protocols such as Internet Protocol.

Client systems 110-A through 110-N send transaction requests to and receive the corresponding responses from network 120, on paths 112A through 112N respectively. Client systems 110-A through 110-N may have several applications running in them such as automated teller applications, ticket reservation and enquiry applications, etc. Data that such applications operate on, is contained in database server 130. For example, in the case of a banking database, database server 130 may store data (such as name, age, account type, credit and debit information, transaction details, etc) corresponding to each customer.

Database server 130 processes the transaction requests (received through network 120 on path 123) from client systems 110-A through 110-N, and sends the corresponding responses on path 123. Database server 130, on receiving a transaction request, performs necessary actions on data stored in it, and sends a response back to the client system that requested the transaction. Some example actions and responses, in the case of a banking database are updating account information, entering latest transaction details and sending back confirmation to the client system from which the transaction request is received.

As noted above in the background section, there may be several instances in which the desired transactions do not get serviced quickly. Various aspects of the present invention overcome some of such disadvantages, as described below in further detail.

3. Transaction Reservation

Figure 2:
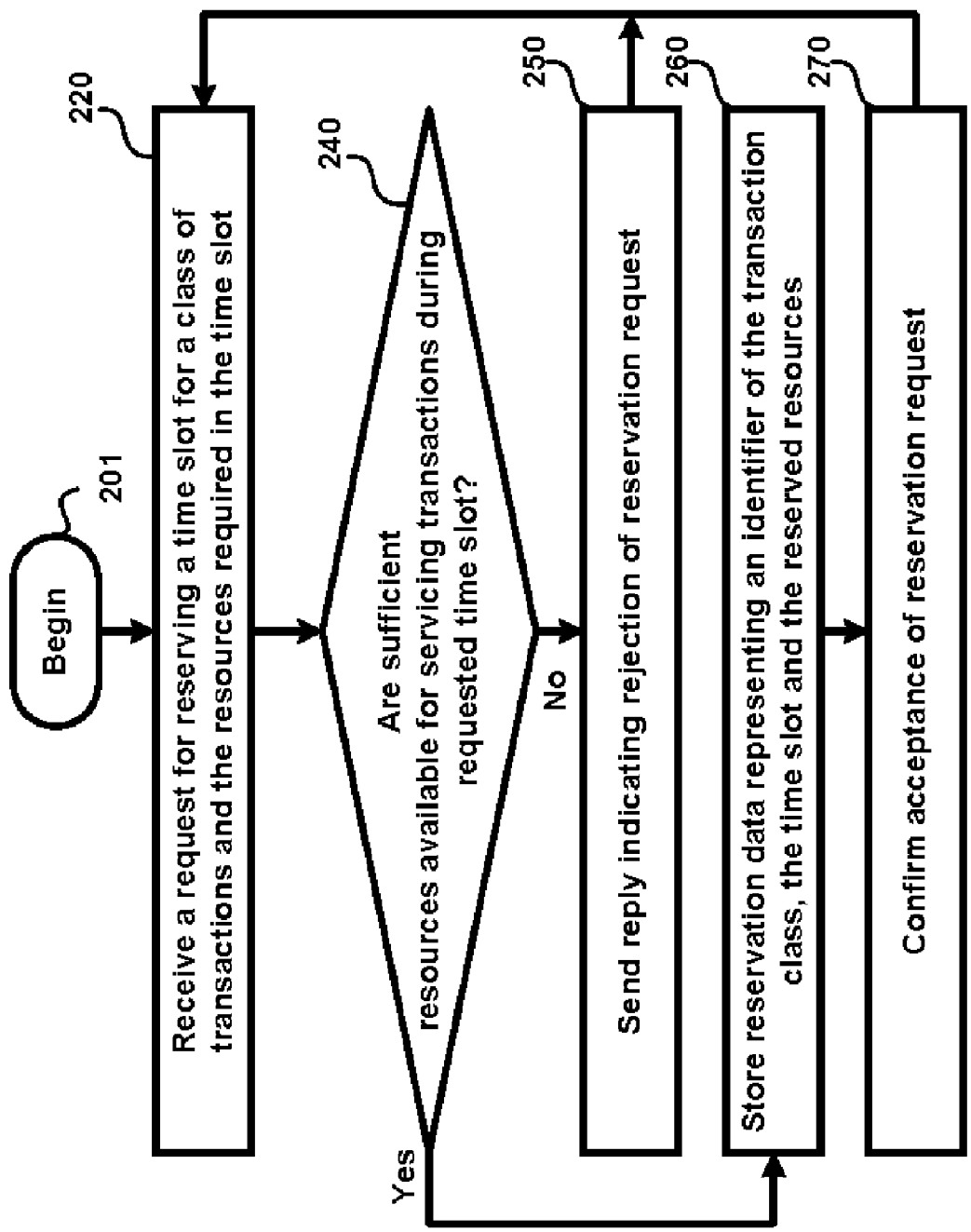
FIG. 2 is a flow chart illustrating the manner in which a database server ensures that a desired set of transactions are serviced timely according to various aspects of the present invention.

FIG. 2 is a flowchart illustrating the manner in which a database server ensures that a desired set of transactions are serviced timely according to various aspects of the present invention. The flowchart is described with respect to FIG. 1 merely for illustration. However, various features can be implemented in other environments without departing from several aspects of the present invention, as will be apparent to one skilled in the relevant arts by reading the disclosure provided herein. The flow chart begins in step 201, in which control immediately passes to step 220.

In step 220, database server 130 receives a request for reservation of a time slot for a class of transactions and the resources required in that time slot. The class of transactions can be based on any grouping (e.g., to a specific database, a specific type of transaction, originating from specific user systems, a specified set of transaction instances, any combinations thereof, etc.) as suited for specific environment and requirements. Conventions can be defined to specify the specific groupings that would be of potential interest, as will be apparent to one skilled in the relevant arts. Also, the request may be received from client systems (in which case the client system may first reserve the time slot and then issue the transaction request) and/or from a database administrator.

In step 240, database server 130 determines if sufficient resources are available for servicing the class of transactions during the requested time slot. In one embodiment, the time duration of interest is divided into small units (e.g., a minute), and each entry in the reservation table (described below) is allocated part of all of a resource in that unit. Database server 130 determines that the reservation can be granted only if the requested resources can be reserved based on aggregate allocations in several of the units within the requested time slot.

In one embodiment, sufficient resources are deemed to be available only if the resources can be allocated with 100% certainty (hereafter "deterministic model"). However, in alternative embodiments, probability based models can be employed if it is known from prior patterns that transactions of interest would be received only with a certain probability (e.g., less than 80%) ("probabilistic model"). Control passes to step 260 if sufficient resources are available, else to step 250 otherwise.

In step 250, database server 130 sends a reply indicating that the reservation request has been rejected. The reply may contain data such as the specific units of time from which the specific ones of the requested resources are not available. Such information may be used to send another request potentially with a longer time duration.

In step 260, database server 130 stores in a reservation table(example table is illustrated in section 6 below), reservation data representing an identifier of the transaction class, the time slot, and the reserved resources. Such information is used again to perform step 240. In step 270, a reply is sent to confirm that the resources have been reserved for the requested class of transactions. Control then passes back to step 220 to process the next reservation request.

The manner in which the transaction instances are then processed, is described below with respect to FIG. 3.

4. Processing Transaction Instances

Figure 3:
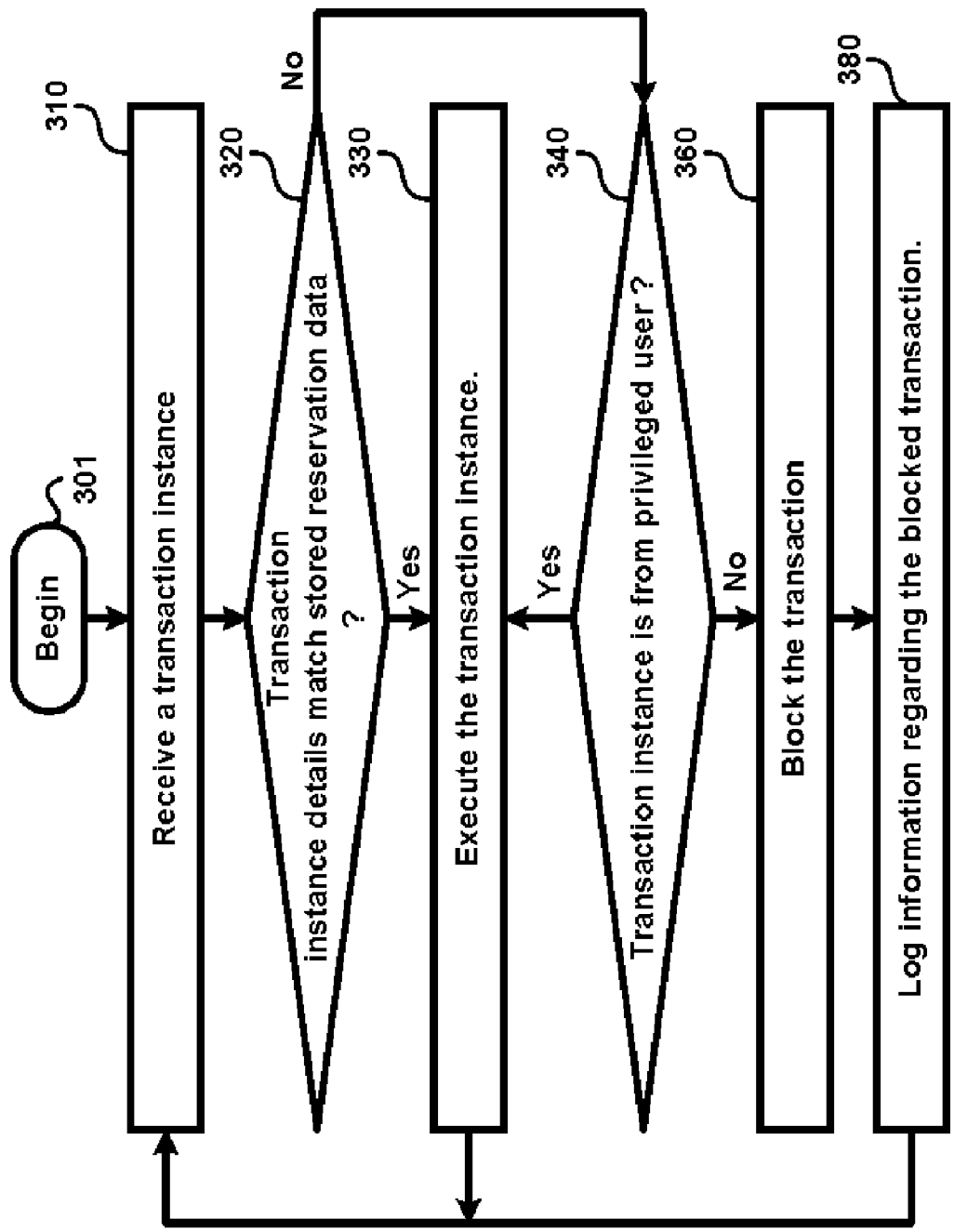
FIG. 3 is a flowchart illustrating the manner in which transaction instances are processed according to an aspect of the present invention.

FIG. 3 is a flowchart illustrating the manner in which transaction instances are processed according to an aspect of the present invention. The flowchart is described with respect to FIGS. 1 and 2 above for illustration. The flow chart begins in step 301, in which control immediately passes to step 310.

In step 310, database server 130 receives a transaction instance from a client system (e.g., 110A). In step 320, database server 130 determines if the transaction instance matches one of the entries of the reservation table stored according to the flowchart in FIG. 2. Such a match would occur if the transaction instance falls within the class specified by the entry, and also the time of reception of the transaction instance falls within the corresponding reserved time slot. Control passes to step 330 if there is a match, and to step 340 otherwise.

In step 330, database server 130 executes (services) the transaction instance and sends a response to the client system that requested the transaction. Control then passes back to step 310 where database server 130 receives another transaction instance.

In step 340, database server 130 determines whether transaction instance is from a privileged user (such as a database administrator, not shown in FIG. 1). Control passes to step 330 (described above) if the transaction instance is from a privileged user, and to step 360 otherwise.

In step 360, database server 130 blocks (denies service) the transaction request. Control then passes to step 380. In step 380, database server 130 logs information regarding the denied transaction request. Such information may be later analyzed to determine resource usage and requirements for a given environment. Control then passes back to step 310, where database server 130 receives another transaction instance for processing.

The features described above can be implemented using various approaches within database server 130. The description is continued with respect to the details of some example embodiments.

5. Database Server

Figure 4:
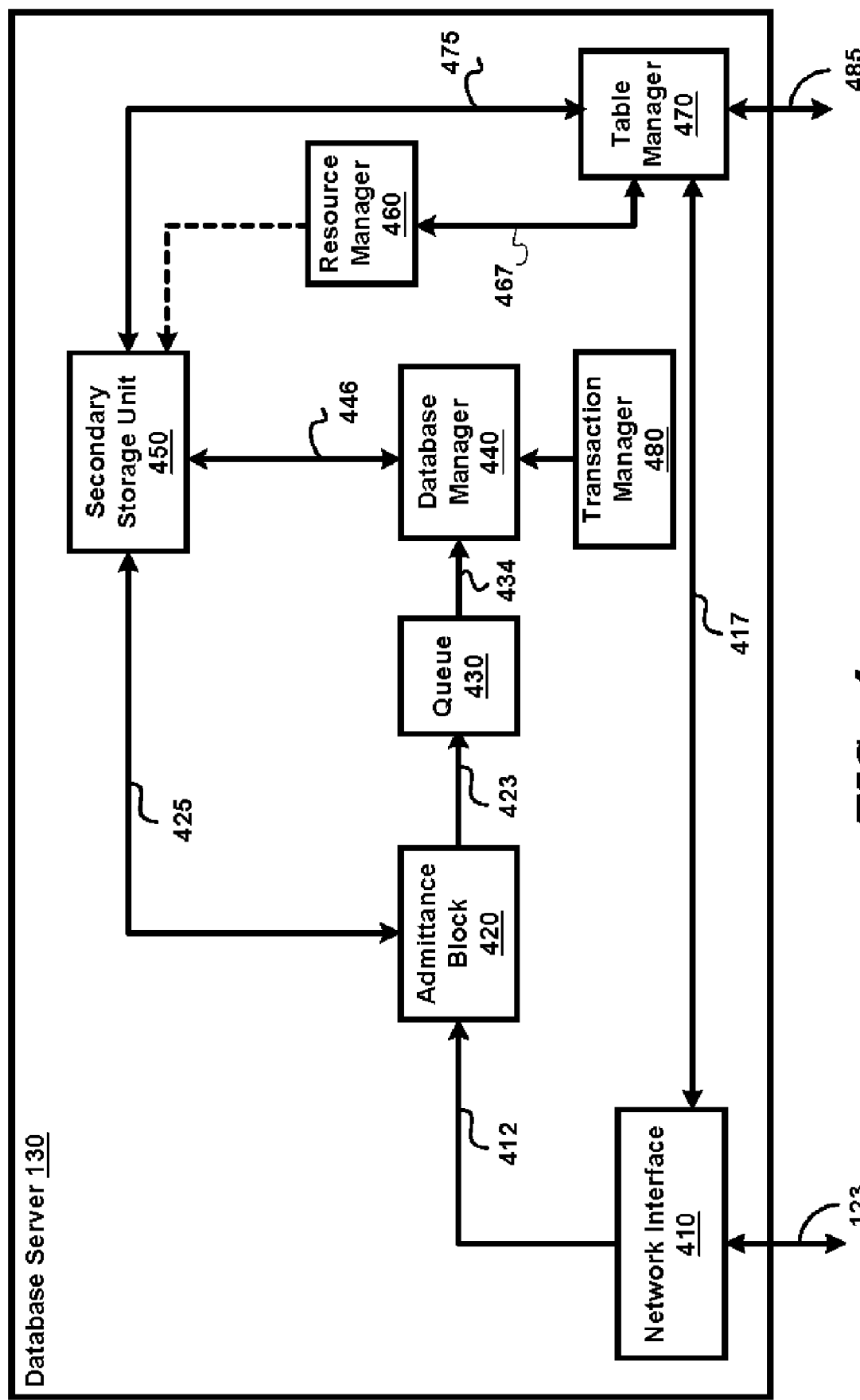
FIG. 4 is a block diagram illustrating the details of a database server in one embodiment.

FIG. 4 is a block diagram illustrating the details of database server 130 in one embodiment. Database server 130 is shown containing network interface 410, admittance block 420, queue 430, database manager 440, secondary storage unit 450, resource manager 460, table manager 470 and transaction manager 480. Each block is described below in further detail.

Network interface 410 provides the physical, electrical and protocol interfaces necessary for database server 130 to send/receive packets on network 120. Secondary storage unit 450 represents a non-volatile memory storage device (example hard disk) that stores various data and control programs, as described below.

Table manager 470 provides a user (e.g., database administrator, not shown) with a suitable user interface to configure resource reservation tables. Such a user interface may be in the form of a keyboard and/or a mouse (path 485) or via network 120 (on path 417). Table manager 470 may operate according to the approaches of FIG. 2 in managing the resource reservation table. In one embodiment, table manager 470 (also) receives requests for reservation of time slots directly from client systems 110-A through 110-N. Such requests are received on path 417 through network interface 410. While creating and managing the resource reservation table, table manager 470 may interact with resource manager 460, on path 467, for determining whether the required resources are available and for securing (reserving) such resources if available.

Database manager 440 stores data in and retrieves data from secondary storage unit 450 through path 445, while processing the queries received on path 434 from queue 430.

Transaction manager 480 co-ordinates with database manager 440, and performs any necessary operations to preserve the atomicity of transactions (upon failure of some of the queries). Resource manager 460 allocates resources (such as processor time, memory space and access to secondary storage unit 450) to queries in queue 430, based on data received from table manager 470 on path 467. The resources may be allocated consistent with the resource reservation table available from secondary storage unit 450. Since access to secondary storage unit 450 is also viewed as a resource, the corresponding connection is shown in dotted line.

Admittance block 420 determines whether to admit (into queue 430) or to block a received transaction based on the resource reservation table received from secondary storage unit 450. The decision whether to admit or block a transaction may be performed according to the approaches described above with respect to FIG. 3. In one extension to the approach described there, admittance block 420 allows a reservation instance without corresponding reservation data, if resources are still available or if reserved transactions fail to occur during a reserved time slot.

Thus, it may be appreciated that the content of the resource reservation table determines whether a transaction is admitted (into the queues) or blocked. The description is accordingly continued with respect to a resource reservation table in one embodiment.

6. Resource Reservation Table

FIG. 5 illustrates the details of a reservation table in one embodiment, and is described with respect to FIG. 4 above for illustration. The table is shown containing columns 511-519, and rows 531 and 532. Each column and row are described below in further detail.

Column 511 contains an identification number of the entry, which may be automatically generated (e.g., sequentially) by table manager 470. Column 512 contains the transaction name (a unique identifier for the transaction instances, as described below), which is used by the admittance block 420 to determine if there is a matching entry in the resource reservation table.

Column 513 contains the start instance of the time slot reserved for the transaction. Column 514 contains the end instance of the time slot reserved for the transaction.

Column 515 contains the identifiers of the database tables database manager 440 would need to access in database server 130 to service the transactions. Column 516 identifies the databases in any other database servers that may need to be accessed to service the transactions. Such information may be used to ensure that the queries related to the subject transaction would not be blocked in such other database servers. Protocols can be designed to facilitate communication between the table managers in the database servers to ensure that all the queries related to a transaction would be successfully completed.

Column 517 contains the name of the user who will execute the transaction. Column 518 contains the amount of processor time (in percentage) reserved for the transaction in the time slot defined by columns 513 and 514. The specific amount of time reserved in smaller time units (e.g., each second) for each entry, may be maintained in another internal table (not shown) and be used by resource manager to allocate the resources. While the table here is shown containing only processor time for illustration, similar entries (and internal tables) may be maintained for other resources (e.g., memory space) also.

Column 519 contains the priority rating for the transaction. In one embodiment, the priority rating is used in allocation of resources in the smaller time units. For example, if a low priority entry and a high priority entry have an overlapping time duration, the higher priority transactions may be given more resources in the overlap duration to the extent the aggregate reserved resources can be satisfied for the low priority entry in the corresponding reserved time slot. In case of equal priority, the resources may be distributed in an even manner.

Rows 531 and 532 contain example resource reservation table entries for two transaction classes consistent with the column definitions above. Row 531 specifies that a transaction class with name Fund_Transfer has a time slot reserved between 1:00 pm, May 12, 2005 and 5:00 pm May 12, 2005, and is shown in a row having a row number 1234. The entry is valid only for transaction instances received from Joe. The percentage of processor time reserved for this transaction class is 50% and the priority rating is HIGH.

The priority is used in case the resources required for execution cannot be allocated (for example because the reservation approach permits reservations even if a resource would be required to be used more than 100% or some of the transactions being services are using more resources than requested). In such a case, the transactions with lower priority are blocked (not admitted into queues).

The queries related to the transaction class would access database instance ORCL present on server ORHCCL on port 3345. The transaction would also access database RTHD on database server hdfg using port 2243.

Similarly, row 532 specifies that a transaction class with name Update_Account has a time slot reserved between 7:00 pm, May 23, 2005 and 9:00 pm May 23, 2005, and is shown in a row having a row number 6738. The entry is valid only for transaction instances that would be received from Scott. The percentage of processor time reserved for this transaction class is 25% and the priority rating is LOW. The priority rating is used as explained above.

The queries related to the transaction class would access database instance ORCL on database server orclhcl123 on port 1234. The transaction class would also access database instance RTHD on database server hdfg123 on port 3563.

In rows 531 and 532 above, transaction name 512 identifies the specific transaction instances to be serviced according to the corresponding entries, as described below.

7. Reservation for Transaction Instances

In one embodiment, a row is deemed to match if the transaction contains a matching name. For example, in $SQL^8$, a transaction to transfer money from checking account of person with customer ID 1000 to savings account of person with customer ID 2000 may be specified as the below combination of SQL queries (forming a transaction):
BEGIN TRANSACTION FUND_TRANSFER
UPDATE CUSTOMER_TABLE
SET BALANCE=BALANCE−3000
WHERE CUSTOMER_ID=1000 AND ACCOUNT_TYPE='CHECKING'

UPDATE CUSTOMER_TABLE
SET BALANCE=BALANCE+3000
WHERE CUSTOMER_ID=2000 AND ACCOUNT_TYPE='SAVINGS'
END;

Thus, when the above transaction instance is received, admittance block 420 determines that there is a match with row 531 (since the transaction instance also has the same label 'Fund_Transfer'), and places the transaction in queue 430. Transaction manager 480 monitors the issuance/completion status of individual queries and ensures that the each transaction is appropriately handled.

Also, while the transaction class in the table of FIG. 5 identifies individual transaction instances based only on data contained in the transaction instance, more general forms of defining classes can also be used in alternative embodiments. Such forms may use a combination of (without limitation) one or more of tables accessed, users, client systems, databases accessed, etc.

It should be appreciated that database server 130 may be implemented in a combination of one or more of hardware, software and firmware. The description is continued with respect to an embodiment which various features are operative by execution of corresponding software instructions.

8. Digital Processing System

Figure 6:
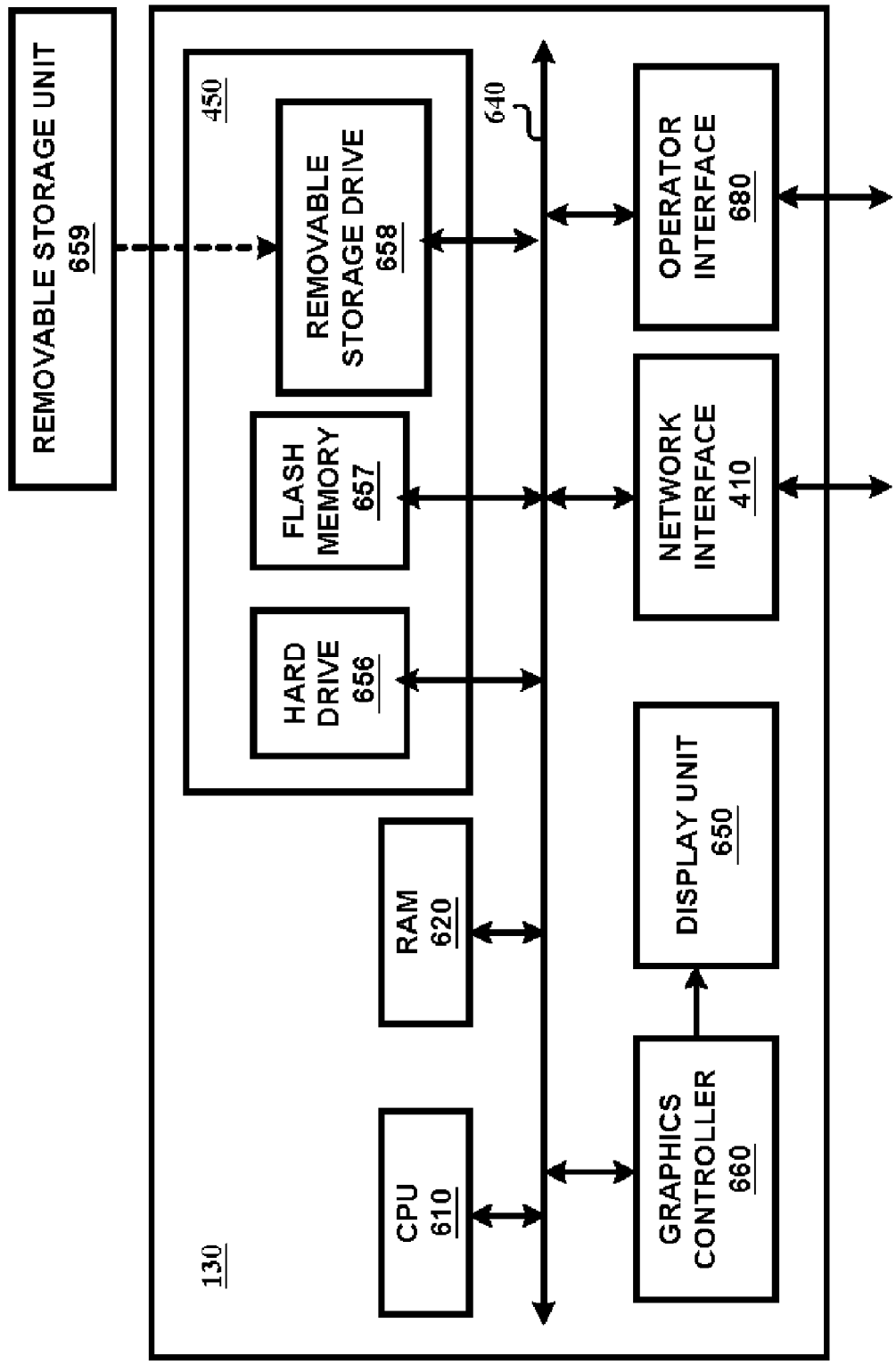
FIG. 6 is a block diagram illustrating the details of a database server in another embodiment.

FIG. 6 is a block diagram illustrating the details of database server 130 in another embodiment. Server 130 may contain one or more processors such as central processing unit (CPU) 610, random access memory (RAM) 620, secondary storage unit 450, graphics controller 660, display unit 650, network interface 410, and operator interface 680. All the components except display unit 650 may communicate with each other over communication path 640, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary storage unit 450 using communication path 640. RAM 620 provides the memory space required for processing of various queries, and is reserved for various classes of transactions, as described above.

Graphics controller 660 generates display signals (e.g., in RGB format) to display unit 650 based on data/instructions received from CPU 610. Display unit 650 contains a display screen to display the images defined by the display signals. Operator interface 680 may correspond to a keyboard and/or mouse and may be used by an operator (for example, a database administrator) to configure resource reservation tables, and also to operate the database server. Network interface 410 provides connectivity to a network (e.g., using Internet Protocol), and may be used to receive various transaction requests and provide the corresponding responses.

Secondary storage unit 450 may contain hard drive 656, flash memory 657, and removable storage drive 658. Secondary storage unit 450 stores reservation tables containing reservation data and may also store other data and software instructions, which enable database server 130 to provide several features in accordance with the present invention. Some or all of the data and instructions may be provided on removable storage unit 659, and the data and instructions may be read and provided by removable storage drive 658 to CPU 610. Floppy drive, magnetic tape drive, CD_ROM drive, DVD Drive, Flash memory, removable memory chip (PCMCIA Card, EPROM) are examples of such removable storage drive 658.

Removable storage unit 659 may be implemented using medium and storage format compatible with removable storage drive 658 such that removable storage drive 658 can read the data and instructions. Thus, removable storage unit 659 includes a computer readable storage medium having stored therein computer software and/or data.

In this document, the term "computer program product" is used to generally refer to removable storage unit 659 or hard disk installed in hard drive 656. These computer program products are means for providing software to server 130. CPU 610 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of ensuring timely servicing of desired transaction instances in a database server, said method comprising:

receiving a reservation request including a transaction class and a time slot in which transaction instances falling in said transaction class are to be serviced;

determining whether a set of system resources will be available to service said transaction class in said time slot, wherein each of said set of system resources is a corresponding hardware component internal to said database server and wherein a resource is available if the aggregate allocations for usage of the resource to other transaction classes in said time slot is such that the resource is available to service said transaction class with at least a corresponding threshold probability;

storing said reservation request associated with an identifier, in a resource reservation table if said set of system resources will be available to service said transaction class in said time slot;

sending said identifier as a response to said reservation request upon determination that said set of resources will be available to service said transaction class in said time slot;

receiving later in time, after receiving said reservation request, a transaction instance along with said identifier;

identifying that said transaction instance falls within said transaction class based on said identifier received with said transaction instance; and admitting said transaction instance for processing by said database server in said time slot based on said identifying, wherein said transaction class represents some of said desired transaction instances such that said transaction instance is timely serviced in said time slot.

2. The method of claim 1, wherein resources required to service said transaction class are also specified in said reservation request, said method further comprising:

rejecting said reservation request if said set of resources are determined not to be available to service said transaction class.

3. The method of claim 1, wherein said reservation request is received from a client system which later sends said transaction instance along with said identifier, said method further comprising:
  receiving another transaction instance;
  examining said reservation table to confirm that said another transaction instance does not fall in any transaction class for which resources are reserved in a present time slot in which said another transaction instance is received; and
  blocking said another transaction instance from admitting based on said examining.

4. The method of claim 1, wherein said threshold probability equals 100% such that said reservation request is stored only if the requested resources can be guaranteed.

5. The method of claim 1, wherein said set of system resources comprises at least one of a processor and a memory,
  wherein said processor is determined to be available to service said transaction class if processor time on said processor is available in said time slot with at least a first threshold probability,
  wherein said memory is determined to be available to service said transaction class if a memory space on said memory is available in said time slot with at least a second threshold probability,
  whereby at least one of said memory and said processor is reserved for servicing said transaction instance.

6. A method performed in a database server, said method comprising:
  receiving a transaction instance at a time instance, wherein servicing said transaction instance in said database server requires a set of system resources, wherein each of said set of system resources is a corresponding hardware component internal to said database server;
  determining whether said transaction instance matches an entry in a resource reservation table, wherein said resource reservation table contains a plurality of entries with each entry specifying a class of transactions and a time slot in which said set of system resources required for servicing said class of transactions have been determined to be available,
  wherein said match is determined to exist if said transaction instance is covered by a class specified by said entry and said time instance is also covered by the time slot for said entry; and
  admitting said transaction instance for servicing in said database server if said determining determines said entry in said resource reservation table.

7. The method of claim 6, further comprising blocking said transaction instance if there is no match.

8. The method of claim 6, wherein said transaction instance contains a label identifying said class covering said transaction instance, said resource reservation table also containing a label column, wherein said determining comprises comparing said label with values in said label column.

9. The method of claim 6, wherein said set of system resources comprises at least one of a processor and a memory,
  wherein said processor is determined to be available to service said transaction class if processor time on said processor is available in said time slot with at least a first threshold probability,
  wherein said memory is determined to be available to service said transaction class if a memory space on said memory is available in said time slot with at least a second threshold probability.

10. A computer readable storage medium storing one or more sequences of instructions causing a database server support processing of transactions, wherein execution of said one or more sequences of instructions by one or more processors contained in said database server causes said database server to perform the actions of:
  receiving a reservation request including a transaction class and a time slot in which transaction instances falling in said transaction class are to be serviced;
  determining whether a set of system resources will be available to service said transaction class in said time slot with at least a threshold probability, wherein each of said set of system resources is a corresponding hardware component internal to said database server; and
  storing, in a resource reservation table, information indicating that transactions falling within said transaction class are to be processed in said time slot if said set of resources are determined to be available.

11. The computer readable storage medium of claim 10, wherein resources required to service said transaction class are also specified in said reservation request, wherein data representing said resources required is also stored in said resource reservation table.

12. The computer readable storage medium of claim 10, wherein said reservation request is received from a client system which later sends a transaction request.

13. The computer readable storage medium of claim 10, wherein said threshold probability equals 100% such that said reservation request is stored only if the requested resources can be guaranteed.

14. A computer readable storage medium storing one or more sequences of instructions causing a database server support processing of transactions, wherein execution of said one or more sequences of instructions by one or more processors contained in said database server causes said database server to perform the actions of:
  receiving a transaction instance at a time instance, wherein servicing said transaction instance in said database server requires a set of system resources, wherein each of said set of system resources is a corresponding hardware component internal to said database server;
  determining whether said transaction instance matches an entry in a resource reservation table, wherein said resource reservation table contains a plurality of entries with each entry specifying a class of transactions and a time slot in which said set of system resources required for servicing said class of transactions are available,
  wherein said match is determined to exist if said transaction instance is covered by a class specified by said entry and said time instance is also covered by the time slot for said entry; and
  admitting said transaction instance for servicing in said database server if said determining determines said entry in said resource reservation table.

15. The computer readable storage medium of claim 14, further comprising blocking said transaction instance if there is no match.

16. The computer readable storage medium of claim 14, wherein said transaction instance contains a label identifying said class covering said transaction instance, said resource reservation table also containing a label column, wherein said determining comprises comparing said label with values in said label column.

17. A database server system comprising:
  a table manager block to receive a reservation request including a transaction class and a time slot in which transaction instances falling in said transaction class are to be serviced;

a resource manager block to determine whether a set of system resources will be available to service said transaction class in said time slot with at least a threshold probability, wherein said set of system resources is a corresponding hardware component internal to said database server;

a database manager block to store said reservation request as a corresponding entry in a resource reservation table, whereby said resource reservation table is stored on a memory and is designed to contain a plurality of entries with each entry specifying a transaction class and a corresponding time slot in which instances of said transaction class are to be serviced;

a network interface to receive a first transaction instance at a first time instance after said storing of said reservation request in said resource reservation table; and an admittance block to check whether said first transaction instance matches an entry in said resource reservation table stored on said memory, wherein said match is found to exist if said first transaction instance is covered by a transaction class specified by said entry and said first time instance is also covered by the time slot for said entry, said admittance block to further admit said first transaction instance for servicing in said database server system if said entry with said match is found.

18. A database server system comprising:

a processor;

a random access memory (RAM); and a computer readable storage medium to store one or more instructions, which when retrieved into said RAM and executed by said processor causes said database server system to perform the actions of:

receiving a reservation request including a transaction class and a time slot in which transaction instances of said transaction class are to be serviced;

determining whether a set of system resources will be available to service said transaction class in said time slot, wherein each of said set of system resources is a corresponding hardware component internal to said database server system and wherein a resource is available if the aggregate allocations for usage of the resource to other transaction classes in said time slot is such that the resource is available to service said transaction class with at least a corresponding threshold probability;

storing said reservation request as a corresponding entry in a resource reservation table, whereby said resource reservation table is designed to contain a plurality of entries with each entry specifying a transaction class and a corresponding time slot in which instances of said transaction class are to be serviced;

receiving a first transaction instance at a first time instance after said storing of said reservation request in said resource reservation table;

checking whether said first transaction instance matches an entry in said resource reservation table, wherein said match is found to exist if said first transaction instance is covered by a transaction class specified by said entry and said first time instance is also covered by the time slot for said entry; and admitting said first transaction instance for servicing in said database server system if said entry with said match is found.

19. The database server system of claim 18, further comprising a secondary storage, wherein said set of system resources comprises at least one of said processor and said RAM wherein said processor is determined to be available to service said transaction class if processor time on said processor is available in said time slot with at least a first threshold probability, wherein said memory is determined to be available to service said transaction class if a memory space on said memory is available in said time slot with at least a second threshold probability.

20. The database server system of claim 19, wherein said resource reservation table is maintained on said secondary storage comprised in said database server system, whereby said storing stores said corresponding entry of said reservation request in said secondary storage, and wherein said checking retrieves said plurality of entries from said secondary storage.

21. A computer readable storage medium storing one or more sequences of instructions causing a database system to ensure timely servicing of desired transaction instances, wherein execution of said one or more sequences of instructions by one or more processors contained in said database system causes said database system to perform the actions of:

receiving a reservation request including a transaction class and a time slot in which transaction instances falling in said transaction class are to be serviced;

determining whether a set of system resources will be available to service said transaction class in said time slot, wherein each of said set of system resources is a corresponding hardware component internal to said database system and wherein a resource is available if the aggregate allocations for usage of the resource to other transaction classes in said time slot is such that the resource is available to service said transaction class with at least a corresponding threshold probability;

storing information indicating that transactions falling within said transaction class are to processed in said time slot if said set of resources are determined to be available with said threshold probability;

receiving later in time, after receiving said reservation request, a transaction instance;

identifying whether said transaction instance falls within said transaction class by examining said stored information;

admitting said transaction instance for processing by said database system based on said identifying, wherein said transaction class represents some of said desired transaction instances such that said transaction instance is timely serviced in said time slot.

22. The computer readable medium of claim 21, wherein resources required to service said transaction class are also specified in said reservation request, said one or more instructions comprising additional instructions for:

rejecting said reservation request if said set of resources are determined not to be available to service said transaction class.

* * * * *